United States Patent
Allen et al.

[11] Patent Number: 5,939,157
[45] Date of Patent: Aug. 17, 1999

[54] CONFORMING SHOE CONSTRUCTION USING GELS AND METHOD OF MAKING THE SAME

[75] Inventors: Bernie Allen, Wayland; Neil M. Goldman, Mansfield, both of Mass.

[73] Assignee: Acushnet Company, Fairhaven, Mass.

[21] Appl. No.: 08/550,333

[22] Filed: Oct. 30, 1995

[51] Int. Cl.[6] .................................................. A43B 13/20
[52] U.S. Cl. ................................ 428/35.7; 36/28; 36/29; 36/35 B; 36/37; 524/474
[58] Field of Search ............................... 428/35.7; 36/28, 36/29, 35 B, 37; 524/474

[56] References Cited

U.S. PATENT DOCUMENTS

| | | | |
|---|---|---|---|
| Re. 32,834 | 1/1989 | Cordts et al. | 524/310 |
| Re. 35,068 | 10/1995 | Tanaka et al. | 523/300 |
| 3,237,319 | 3/1966 | Hanson | 36/2.5 |
| 3,548,420 | 12/1970 | Spence | 3/20 |
| 3,765,422 | 10/1973 | Smith | 128/594 |
| 4,038,762 | 8/1977 | Swan, Jr. | 36/89 |
| 4,083,127 | 4/1978 | Hanson | 36/93 |
| 4,153,571 | 5/1979 | Garvin et al. | 252/156 |
| 4,188,373 | 2/1980 | Krezanoski | 424/78 |
| 4,211,236 | 7/1980 | Krinsky | 128/594 |
| 4,243,754 | 1/1981 | Swan, Jr. | 521/55 |
| 4,252,910 | 2/1981 | Schaefer | 521/145 |
| 4,255,202 | 3/1981 | Swan, Jr. | 106/122 |
| 4,293,440 | 10/1981 | Elphingstone et al. | 252/317 |
| 4,471,538 | 9/1984 | Pomeranz et al. | 36/28 |
| 4,495,169 | 1/1985 | Schmolka | 424/73 |
| 4,534,958 | 8/1985 | Adams et al. | 424/45 |
| 4,534,959 | 8/1985 | Schmolka | 424/45 |
| 4,541,186 | 9/1985 | Mulvihill | 36/114 |
| 4,555,344 | 11/1985 | Cussler | 210/670 |
| 4,585,647 | 4/1986 | Schmolka | 424/45 |
| 4,614,612 | 9/1986 | Reilly et al. | 252/541 |
| 4,616,430 | 10/1986 | McQuiggin | 36/14 |
| 4,662,087 | 5/1987 | Beuch | 36/88 |

(List continued on next page.)

FOREIGN PATENT DOCUMENTS

US94/05400 11/1995 WIPO.

OTHER PUBLICATIONS

I.R. Schmolka, "BWC Surfactants in Gel Cosmetics," Cosmetics & Toiletries, vol. 92, pp. 77–79 (Jul. 1977).
T. Tanaka, "Gels," Scientific American, vol. 244, pp. 124–138 (1981).
Kirk–Othmer, "Encyclopedia of Chemical Technology—Third Edition," vol. 20, pp. 207–230 (1982).
I.R. Schmolka, "A Comparison of Block Copolymer Surfactant Gels," Journal of American Oil Chemist's Soc'y, vol. 68, pp. 206–209 (Surfactants & Detergents, Mar. 1991).
I.R. Schmolka & L.R. Bacon, "Viscosity Characteristics of Aqueous Solutions of Block Copolymers of Propylene and Ethylene Oxides," Journal of American Oil Chemist's Soc'y, vol. 44, pp. 559–562.
M. Malsten & B. Lindman, "Effects of Homopolymers on the Gel Formation in Aqueous Block Copolymer Solutions," Macromolecules, vol. 26, pp. 1282–1286 (1993).
BASF Wyandotte Corp., "Technical Data on . . . Pluronic® Polyol Gels," pp. 1–5 (Publication 0–513).
SC: 1102–89 (Apr. 1989) "KRATON® Thermoplastic Rubbers in Oil Gels".
"Revolutionary ATS Technology".

Primary Examiner—Charles Nold
Attorney, Agent, or Firm—Pennie & Edmonds LLP

[57] ABSTRACT

A shoe that conforms to foot contours and provides cushioning is comprised of a shoe sole and a shoe upper attached to the shoe sole. The shoe upper is comprised of an outer layer, an inner layer and a conforming layer therebetween, wherein a first portion of the conforming layer is comprised of environmentally-responsive gel. The environmentally-responsive gel is a temperature-responsive gel that will react to the heat emanating from a foot inserted into the shoe to express a liquid.

16 Claims, 13 Drawing Sheets

U.S. PATENT DOCUMENTS

| | | | |
|---|---|---|---|
| 4,728,551 | 3/1988 | Jay | 428/76 |
| 4,732,930 | 3/1988 | Tanaka et al. | 524/742 |
| 4,744,157 | 5/1988 | Dubner | 36/88 |
| 4,771,554 | 9/1988 | Hannemann | 36/27 |
| 4,783,910 | 11/1988 | Boys, II et al. | 36/107 |
| 4,808,469 | 2/1989 | Hiles | 428/318.6 |
| 4,817,304 | 4/1989 | Parker et al. | 36/114 |
| 4,828,701 | 5/1989 | Cussler | 210/634 |
| 4,863,613 | 9/1989 | Johnson et al. | 210/670 |
| 4,876,805 | 10/1989 | Peoples | 36/43 |
| 4,888,168 | 12/1989 | Potts et al. | 424/78 |
| 4,911,691 | 3/1990 | Aniuk et al. | 604/164 |
| 4,934,072 | 6/1990 | Fredericksen et al. | 36/29 |
| 4,942,035 | 7/1990 | Churchill et al. | 424/423 |
| 4,957,620 | 9/1990 | Cussler | 210/635 |
| 4,977,691 | 12/1990 | Orchard, 3rd | 36/44 |
| 5,000,955 | 3/1991 | Gould et al. | 424/409 |
| 5,005,575 | 4/1991 | Geri | 128/581 |
| 5,015,427 | 5/1991 | Sosnow | 264/115 |
| 5,058,585 | 10/1991 | Kendall et al. | 128/581 |
| 5,059,417 | 10/1991 | Williams et al. | 424/53 |
| 5,067,255 | 11/1991 | Hutcheson | 36/43 |
| 5,070,629 | 12/1991 | Graham et al. | 36/27 |
| 5,071,644 | 12/1991 | Viegas et al. | 514/772.7 |
| 5,077,033 | 12/1991 | Viegas et al. | 514/668 |
| 5,097,607 | 3/1992 | Fredericksen | 36/291 |
| 5,100,933 | 3/1992 | Tanaka et al. | 523/300 |
| 5,101,580 | 4/1992 | Lyden | 36/93 |
| 5,126,141 | 6/1992 | Henry | 424/423 |
| 5,131,174 | 7/1992 | Drew et al. | 36/35 B |
| 5,143,731 | 9/1992 | Viegas et al. | 424/486 |
| 5,149,588 | 9/1992 | Fukushima et al. | 428/411.1 |
| 5,155,927 | 10/1992 | Bates et al. | 36/28 |
| 5,160,627 | 11/1992 | Cussler et al. | 210/639 |
| 5,183,879 | 2/1993 | Yuasa et al. | 528/503 |
| 5,203,793 | 4/1993 | Lyden | 36/88 |
| 5,242,491 | 9/1993 | Mamada et al. | 106/241 |
| 5,252,318 | 10/1993 | Joshi et al. | 424/78.04 |
| 5,262,468 | 11/1993 | Chen | 524/476 |
| 5,274,018 | 12/1993 | Tanaka et al. | 524/166 |
| 5,287,638 | 2/1994 | Preston | 36/28 |
| 5,292,516 | 3/1994 | Viegas et al. | 424/423 |
| 5,298,260 | 3/1994 | Viegas et al. | 424/486 |
| 5,300,295 | 4/1994 | Viegas et al. | 424/427 |
| 5,311,678 | 5/1994 | Spademan | 36/114 |
| 5,313,717 | 5/1994 | Allen et al. | 36/28 |
| 5,315,769 | 5/1994 | Barry et al. | 36/114 |
| 5,331,059 | 7/1994 | Engelhardt et al. | 525/349 |
| 5,336,708 | 8/1994 | Chen | 524/474 |
| 5,343,638 | 9/1994 | Legassie et al. | 36/29 |
| 5,354,835 | 10/1994 | Blair | 528/59 |
| 5,357,693 | 10/1994 | Owens | 36/71 |
| 5,363,570 | 11/1994 | Allen et al. | 36/28 |
| 5,366,735 | 11/1994 | Henry | 424/426 |
| 5,376,693 | 12/1994 | Viegas et al. | 523/106 |
| 5,383,290 | 1/1995 | Grim | 36/93 |
| 5,403,893 | 4/1995 | Tanaka et al. | 525/218 |
| 5,407,445 | 4/1995 | Tautvydas et al. | 623/8 |
| 5,441,732 | 8/1995 | Hoeg et al. | 424/78.04 |
| 5,475,882 | 12/1995 | Sereboff | 3/450 |
| 5,493,792 | 2/1996 | Bates et al. | 36/28 |

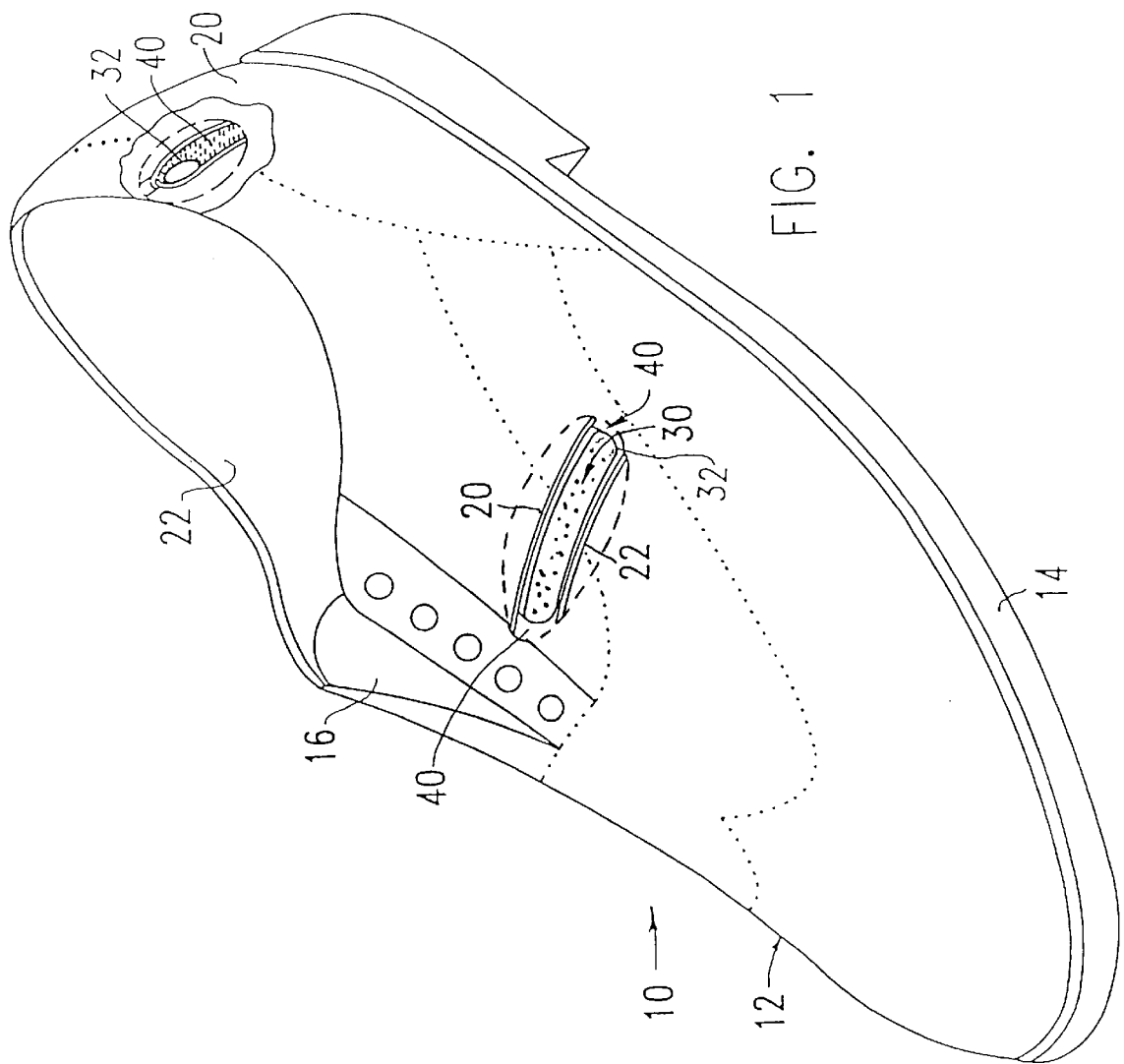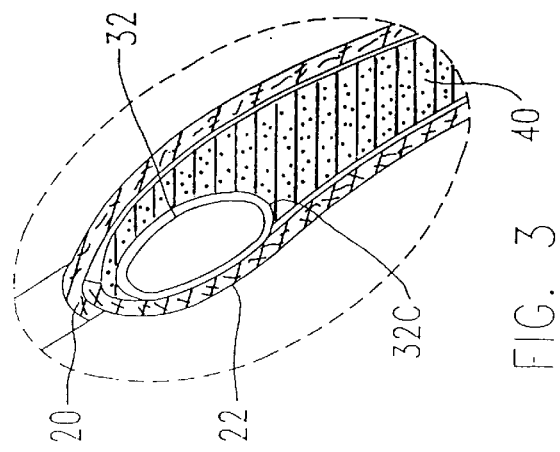

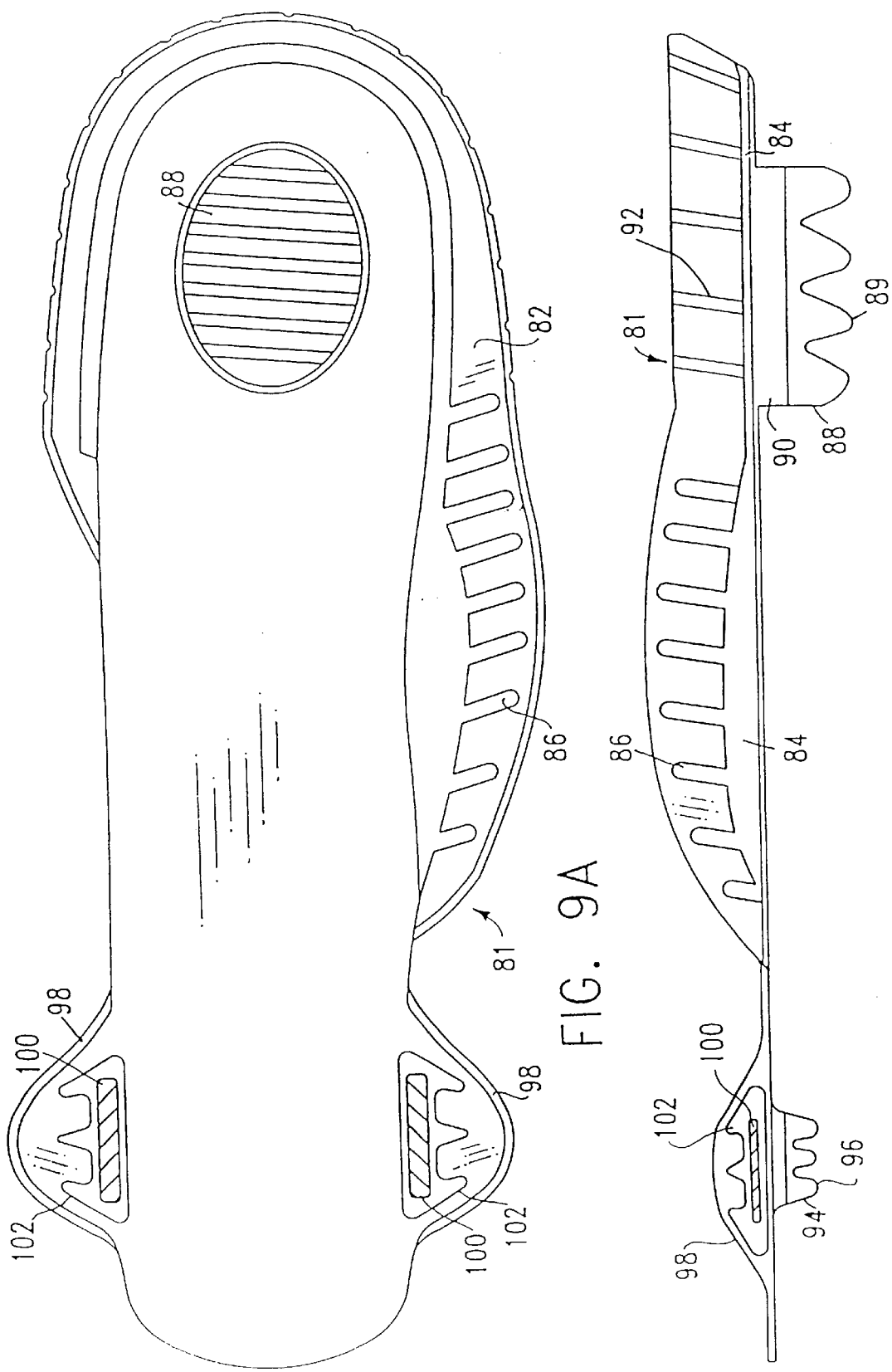

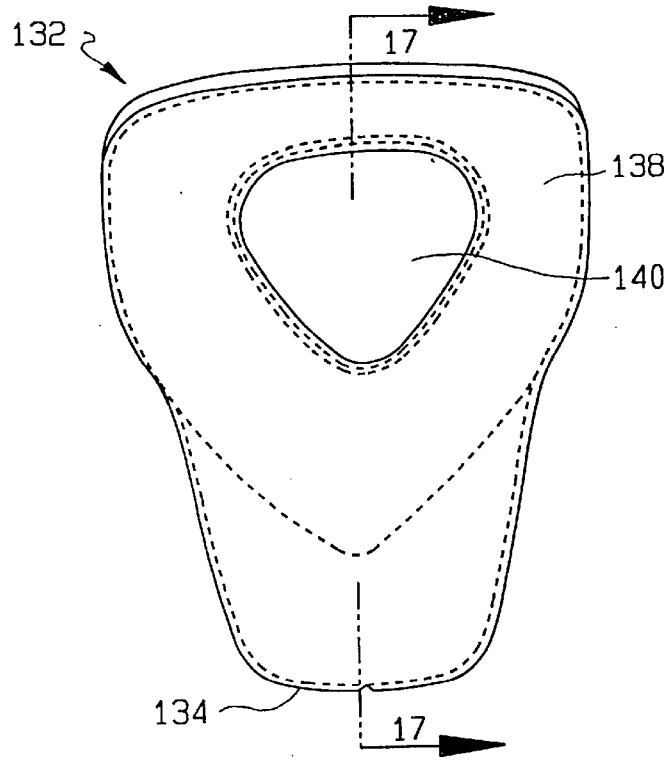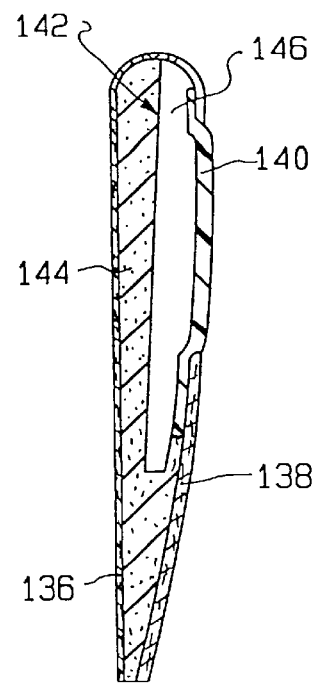
FIG. 16          FIG. 17
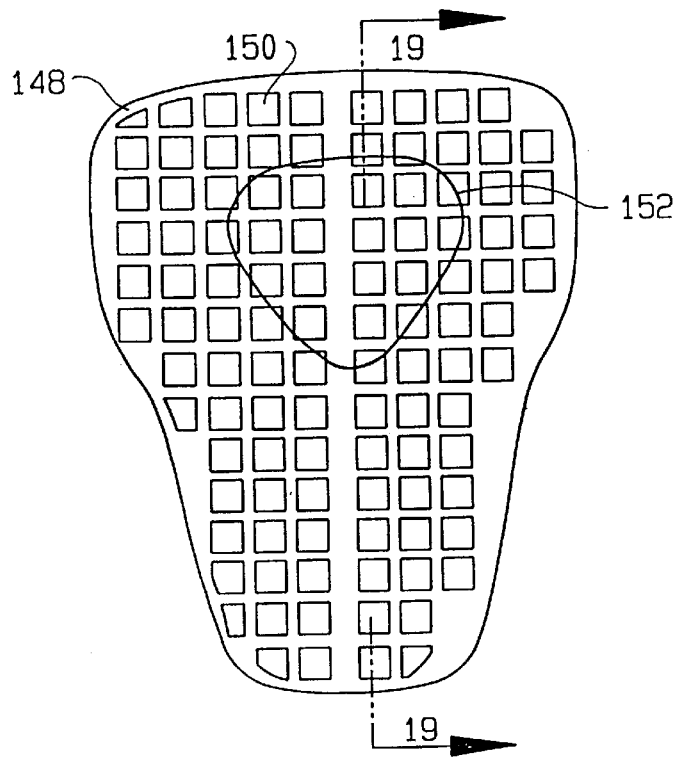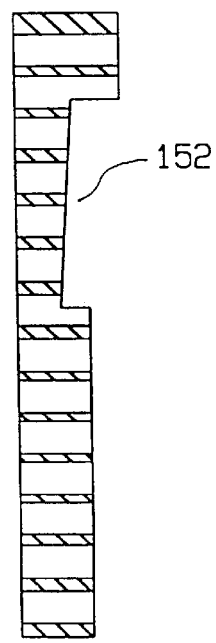
FIG. 18          FIG. 19 ated fitting shoe construction using gels and a method of forming the same. More particularly, the invention relates to a shoe that incorporates various gels to provide a conforming medium for a customized fitting shoe upper, tongue and foot bed and to methods of forming the shoe upper, tongue and foot bed.

CONFORMING SHOE CONSTRUCTION USING GELS AND METHOD OF MAKING THE SAME

TECHNICAL FIELD

This invention relates to a customized fitting shoe construction using gels and a method of forming the same. More particularly, the invention relates to a shoe that incorporates various gels to provide a conforming medium for a customized fitting shoe upper, tongue and foot bed and to methods of forming the shoe upper, tongue and foot bed.

BACKGROUND OF THE INVENTION

Various methods and devices have been employed in shoes to add cushioning to the shoe and to provide complementary custom fitting configurations to the contours of a foot inserted into the shoe. For example, U.S. Pat. No. 5,313,717, which issued to one of the present inventors, is directed to a shoe which incorporates reactive-energy, fluid-filled cavities in the shoe mid-sole. As discussed therein, typical prior art devices provide cushioning and custom fit to the foot inside the shoe by constructing the shoe sole from a softer, more resilient material or incorporating fluid filled pads or bladders in the shoe.

The use of gels to provide a conforming fit or cushion is known in the prior art. However, the prior art gels generally set to fit the contours of a foot and do not provide a soft cushion fit or they are soft liquid gels that must be placed in a bladder.

Prior art gels, which have been used to provide comfort, conformity, and stability in shoe and sock liner applications, are heat sensitive, and tend to soften on heating. This softening can result in a loss of support and a decrease in stability.

In other shoes designed to provide cushioning or custom fitting, either an air filled foam or an air "pump" has been used to conform to the foot which is inserted into the shoe. The foam is a material that reacts to foot pressure by allowing the air therein to become compressed and/or escape and therefore resiliently compresses upon pressure from the foot. The material does not have the capability to expand to the non-pressure areas of the foot. Shoes that incorporate an air "pump" fill in air around the foot so that the shoe conforms to the foot therein, but in doing so, increases the pressure on the foot. This increased pressure and foot surrounding air pocket tends to greatly increase the foot temperature. Thus, these solutions provide fit or comfort either by merely displacing at locations of higher pressure or by increasing the pressure completely around the foot. Thus, these shoes do not conform fully to the foot therein at normal pressures.

SUMMARY OF THE INVENTION

The present invention is directed to a shoe which conforms to contours of a foot inserted into the shoe. The shoe employs a solid foam matrix that contains elements of a soft, highly flowable viscoelastic gel, a foam and/or an environmentally-responsive gel. Preferably, the shoe uses soft elastomeric gel or foamed elastomeric gel to provide a flowable, viscoelastic medium that will conform to the foot as the foot is inserted into the shoe. The invention is also directed to the use of a temperature-responsive gel that can react to the heat exerted by the foot inserted into the shoe to provide a conforming medium for fit and cushioning. Each of these gels can be located in proper position by surrounding the gels with a memory foam or other commercially available foams.

In a preferred embodiment of the invention, the shoe incorporates an environmentally-responsive gel. An environmentally-responsive gel is a microporous, fast responsive, crosslinked gel obtainable from a polymeric precursor, the gel being of sufficient flexibility to enable the gel to be reversibly responsive to a change in an environmental condition. The environmentally-responsive gel can be made from any responsive polymer with side groups that can react with a di- or multi- functional crosslinking molecule. The polymers can have hydroxyl, acid or amine side groups which have lower critical solution temperatures in aqueous solutions together with water-soluble crosslinkers. Even more particularly, the gel is a temperature-responsive gel and is able to undergo a phase separation which is temperature-induced. Still further, the precursor is preferably a linear polymer or cellulose ether such as hydroxypropyl acrylate/hydroxyethyl acrylate copolymer. Also, the water-based fluid used to make the gel can include sucrose in the range of 30% to 60% to vary the reaction temperature.

The environmentally-responsive gel can also be comprised of a material that is a liquid at room temperature and a gel having an increased viscosity at approximately body temperature. In this manner, the environmentally-responsive gel can be a liquid in a footwear application such as a shoe or foot bed before it is put to use by the user. When the user inserts her foot into the footwear, the liquid can flow at a first rate to conform to the foot. The temperature-responsive gel is then heated to body temperature by the foot and increases in viscosity to provide a conforming fit and stability. At this point, the gel composition is in a gel state and flows at a second rate that is substantially lower than the first rate. One such material is a polymer gel comprised of a mixture of water and a polyethyleneoxide/polypropyleneoxide (PEO-PPO) block-copolymer which can contain additives such as polyethyleneoxide (PEO) homopolymer and/or polypropyleneoxide (PPO) homopolymer, and hydrophilic compounds such as alcohols, acids, salts, and the like.

The invention is also directed to the use of a polyurethane gel that provides a highly flowable viscoelastic medium and does not require a gel bladder. The polyurethane gel can be provided in various hardnesses to provide proper mediums for shoe comfort, including fit and cushioning. The polyurethane gel is preferably a soft elastomer with high sol (plasticizer) fraction which can include a high molecular weight triol (MW greater than 6000) and a diisocyanate. The polyol can be made of Arcol E-452 and the plasticizer can be a Paraffin oil or dipropylene glycol dibenzoate.

In another embodiment of the present invention, the flowable viscoelastic gel is a butadiene style rubber which can be prepared from oil and polyisobutadiene. Preferably, the gel is made from oil such as Kaydol and a styrene ethylene butadiene styrene triblock medium molecular weight rubber polymer such as Kraton 1650 M. Kaydol is a paraffin (55%) and naphtenic (45%). By increasing the percentage of Kraton, the firmness of the gel can be increased for various locations where a firmer gel is desired. Still further, plastic, expanded, resilient, hollow microspheres such as Expancel 091 DE80, expanded glass hollow microspheres or a blowing agent can be added to the gel to reduce weight or the gel can be frothed with air using ultrasonic cavitation.

Still further, the foam can be comprised of a polyurethane foam with hollow microspheres or a blowing agent. In another embodiment, a memory foam can be comprised of a polyol, antifoam agent, catalyst and Isocyanate.

The invention is directed to a shoe that conforms to the foot contours by incorporating a shoe upper that is comprised of three layers; the shoe outer layer, the shoe inner layer, and a conforming layer therebetween. The conforming layer can be comprised of portions made from highly flowable, viscoelastic gels, foam and temperature-responsive gels. Preferably, the invention includes soft, highly flowable viscoelastic gel or temperature-responsive gels provided in areas of the shoe that correspond to those areas of the foot that are generally highly contoured or have greater curvature for better fit and comfort. In areas where stability or shock cushioning is desired, a more viscous (less flowing gel) is used and in areas where fit and comfort are required, a softer, less viscous (more flowing) gel is used.

As stated above, the invention can also include a temperature-responsive gel that reacts to the heat dissipated from the foot inserted into the shoe to express a liquid that will fill a bladder to allow the shoe to further conform and provide cushioning and securing fit for the foot therein.

Further, the invention is directed to a shoe incorporating a tongue which can have portions made from highly flowable, viscoelastic gels and temperature-responsive gels to provide a customized fit and cushioning to the top of the foot that has been inserted into the shoe.

Still further, the present invention is directed to a shoe which conforms to the foot by providing a foot bed comprised of viscoelastic gels and/or temperature-responsive gels therein to conform to and provide cushioning for the foot bottom. Preferably, the shoe foot bed is formed of a low-flowable, harder gel such that it provides supportive cushioning for the foot bottom, for absorbing the impacts of walking and the like. Further, the foot bed should provide a soft, highly flowable gel to provide custom fit and comfort for the foot and, particularly for the foot arch and heel. This is preferably accomplished with the proper placement of various elastomeric and temperature-responsive gels having proper hardnesses and viscosities to provide comfortable and supportive mediums against the foot. Still further, the foot bed is formed with the combination of gels encapsulated in a polyurethane foam or preferably a memory foam matrix. This provides customizable fit, comfort, cushioning and stability all in the same system.

The present invention is also directed to a method of forming a customized fitting shoe. The method includes forming a shoe upper which is comprised of the steps of molding flowable, viscoelastic gel and foam to form a conforming layer of a shoe upper. Preferably, the method of forming a customized fitting shoe upper is comprised of the steps of pouring flowable viscoelastic gel into proper locations of a mold, pouring polyurethane foam or memory foam ingredients into the mold, closing the top of the mold which can have the shoe inner layer attached thereto, heating the mold and removing the gel, formed foam and shoe inner layer. Then a temperature-responsive gel and bladder containing the same can be placed in proper locations and an outer layer can be attached to the opposite side of the conforming layer from the inner layer.

Still further, the method includes forming a temperature-responsive gel and bladder by vacuum forming an approximately 10 mil thick plastic bottom film into a mold, placing a die cut temperature responsive gel which is at a relatively cold temperature into the mold cavity, placing a flat top layer of approximately 5 mil thick plastic film over the mold, attaching the top and bottom films using a radio frequency sealing or other sealing method.

Even still further, the present invention is directed to a method of forming a shoe foot bed comprising the steps of pouring relatively hard, high viscosity, viscoelastic gel into the foot bed heel plug section of a mold, pouring a relatively soft, highly flowable, viscoelastic gel into proper locations of the mold for providing a conforming fit and comfort, pouring polyurethane foam or memory foam ingredients into the mold, covering the mold with the mold top, which can have the foot bed cover fabric attached thereto, and heating the mold.

Still further yet, the present invention is directed to a polymer gel comprised of a mixture of water and a polyethyleneoxide/polypropoleneoxide (PEO-PPO) block-copolymer. The solution preferably contains a polyethyleneoxide (PEO) homopolymer or polypropyleneoxide (PPO) homopolymer and/or hydrophilic compounds such as alcohols, acids, and salts. This gel can be formed so that it is a liquid at room temperature and a gel at body temperature or vice versa.

BRIEF DESCRIPTION OF THE DRAWINGS

FIG. 1 is a perspective view of a shoe according to the present invention and incorporating a temperature-responsive gel and bladder for the same.

FIG. 3 is an enlarged, cross-sectional view of the temperature-responsive gel bladder in the shoe upper.

FIG. 9A is a top view of a second embodiment of the foot bed according to the present invention.

FIG. 9B is a cross-sectional, side view of the second embodiment of the foot bed according to the present invention.

FIG. 16 is a top view of a shoe tongue according to the present invention.

FIG. 17 is a sectional view taken along line 17—17 in FIG. 16.

FIG. 18 is a top view of another embodiment of a shoe tongue inner layer.

FIG. 19 is a sectional view taken along line 19—19 in FIG. 18.

DETAILED DESCRIPTION OF THE PREFERRED EMBODIMENTS

Figure 2:
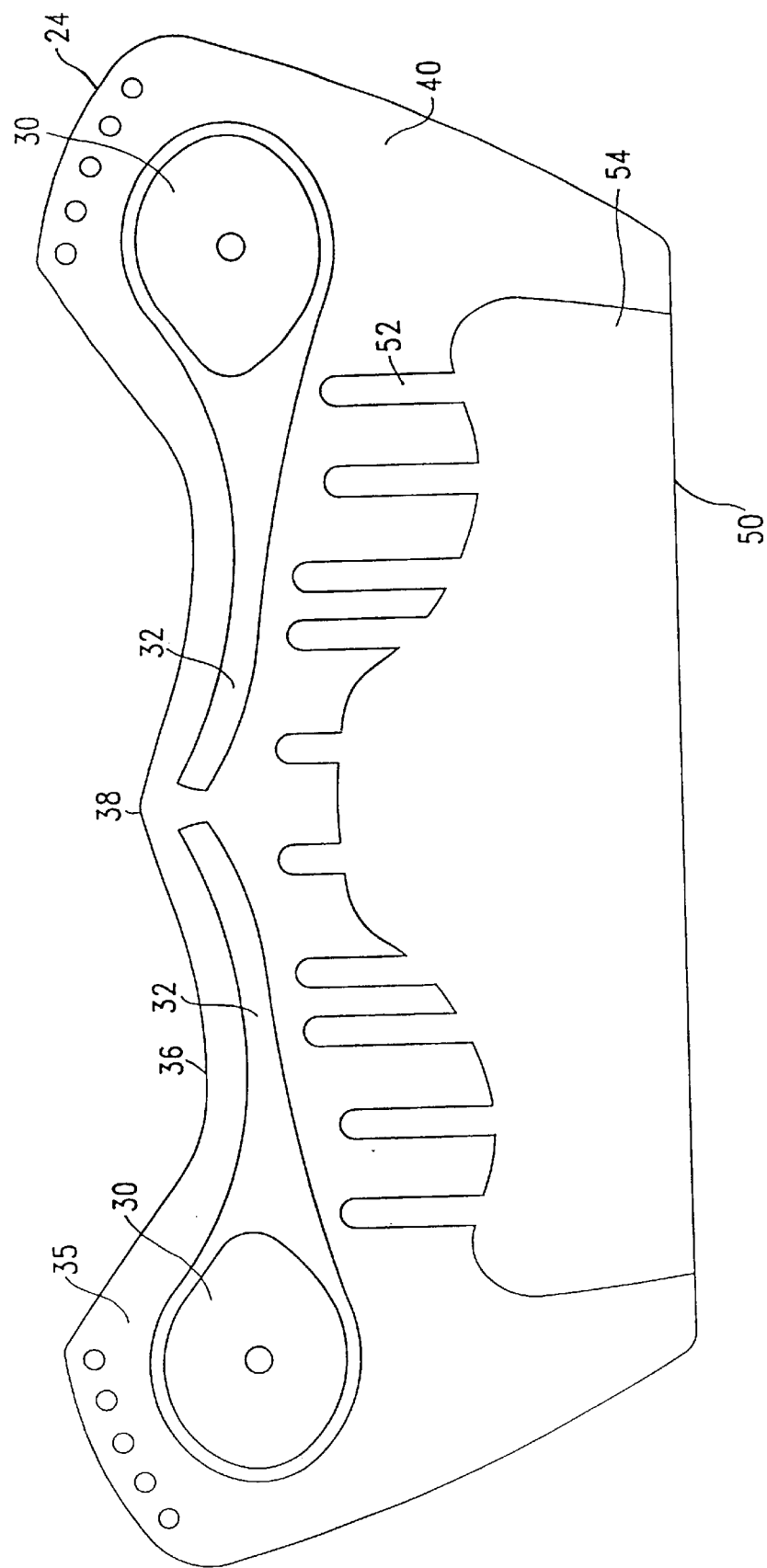
FIG. 2 is a perspective view of a conforming layer of the shoe according to the present invention.

Referring to FIG. 1, the preferred embodiment of the present invention is a shoe 10 that incorporates a shoe upper 12 and a shoe sole 14. Inside the shoe 10 and not shown is a shoe mid-sole. The shoe upper 12 is comprised of an outer layer 20 and an inner layer 22. In between the inner and outer layer is a conforming layer 24 as disclosed in FIG. 2. In the preferred embodiment, the inner layer 22 is made of brush nylon or leather and the outer layer 20 is made of leather.

The conforming layer 24 in FIG. 2 is comprised of a first flowable viscoelastic gel portion 50, a second temperature-responsive gel portion 30 and its bladder 32 and a third foam portion 40.

The viscoelastic gel portion 50 is preferably comprised of a flowable viscoelastic gel that is incompressible, i.e., it retains its volume upon compression. Therefore, this material, when compressed by pressure from the foot inserted into the shoe, will flow into another location where the pressure is not as great. In the preferred embodiment, the viscoelastic gel is molded into a body section 54 and a plurality of connected fingers 52. This enables the viscoelastic gel portion 50 to conform to the foot inserted into the shoe. And as one skilled in the art would appreciate, the viscoelastic gel portion 50 can be molded in many shapes. However, in the preferred embodiment, the viscoelastic gel portion 50 should be molded into areas of the shoe which correspond to highly contoured areas of the foot. For instance, the heel of the foot generally tends to be very contoured and, therefore, the viscoelastic gel portion 50 is preferably located so that the shoe can substantially conform the foot heel. Thus the viscoelastic gel portion 50 preferably extends to correspond to the heel bone and malleoli bones of the foot.

Preferably, the viscoelastic gel portion 50 is comprised of a polyurethane gel, but other gels which disclose the desired properties of elasticity and flowing nature can also be used. In the shoe upper, the viscoelastic gel is preferably of a relatively soft, highly flowable gel. That is, the gel has a –000 hardness of approximately 10 to 100 and preferably about 40. Moreover, the viscoelastic gel portion can be formed of various hardnesses to best conform to the foot. For example, the body section 54 can be made from a soft gel of approximately 40 to 60 –000 hardness and the extending fingers can be made from the same gel hardness or a gel having a lower hardness and being more flowable.

Another advantage to using a viscoelastic gel is that the gel does not need to be encapsulated into a bladder, i.e. the gel is not surrounded by a plastic liner to limit the flow thereof. Since the preferred material is a flowable gel, it can be formed directly between the front and back layers 20 and 22.

In one embodiment, the flowable viscoelastic gel is a soft elastomer with high sol (plasticizer) fraction which can include a high molecular weight triol (MW greater than 6000) and a diisocyanate. The polyol can be made of Acrol E-452 brand polyol and the plasticizer can be a Paraffin oil or dipropylene glycol dibenzoate.

In another embodiment, the flowable viscoelastic gel is a butadiene style rubber. The rubber can be prepared from oil and polyisobutadiene. Preferably, oil such as Kaydol and a styrene ethylene butadiene styrene tri block medium molecular weight rubber polymer such as Kraton is used. More preferably, 60 ml of Kaydol and 7.5 g of Kraton 1650 M are mixed and heated to 140 degrees F. for 1 hour. The material is stirred twice during the 1 hour and then poured into a cool and set into a gel. By increasing the percentage of Kraton, the firmness of the gel can be increased for various locations where a firmer gel is desired or vice versa. Still further, expanded, resilient, plastic, hollow microspheres such as Expancel 091 DE80, expanded, glass microspheres or a blowing agent can be added to the gel to reduce the weight of the gel. Still further, the gel can be frothed with air using ultrasonic cavitation or unexpanded Expancel DU grade microspheres can be used and expanded during processing.

In another embodiment, the flowable viscoelastic gel is a silicone gel. A benefit of using this gel is that it does not leach out oil over time like rubbers/oil mixtures. Therefore, it is suitable for use next to materials such as leather. One silicone gel which may be used is vinyl polydimethyl siloxane. A preferred commercially available form of this gel is General Electric RTV6139A-D1. Another silicone gel which may be used is methyl hydrogen dimethyl siloxane. A preferred commercially available form of this gel is General Electric RTV6139B-D1.

A temperature-responsive gel is described as a chemically or physically crosslinked three dimensional polymeric network that contains a substantial quantity of liquid so that the properties of the gel are determined by both the polymeric network and the liquid. If the liquid is water, the gel is commonly called a "hydrogel." The volume of this type of "reactive gel" may contract by a factor of up to several hundred percent when the gel undergoes a change in external conditions, such as temperature, Ph, solvent or solvent concentration, ionic concentration, light, pressure or electric field. Preferably, the gel used for this application is of the type that reacts to temperature and/or pressure and recovers once the external condition is removed.

The network material of a responsive hydrogel as used in the preferred embodiment, may be comprised of a number of polymeric materials that possess a lower critical solution temperature (LCST). The term LCST is the temperature below which the polymer is substantially soluble in liquid and above which the polymer is substantially insoluble. Therefore, the responsive gel forms a two phase system.

The preferred temperature-responsive gel portion 30 is comprised of a hydrogel gel. Examples of gels are given in U.S. Pat. No. 5,183,879 and PCT Patent Application No. PCT 94-05400. The preferred temperature-responsive gel contracts upon application of heat from the foot inserted within shoe 10 and thereby extracts water from the gel. As the shoe temperature rises from the foot that is inserted therein and moves during normal activity, the gel contracts. Therefore, the temperature-responsive gel section 30 can be located anywhere in the shoe to assist in conforming to the foot contours, but, preferably, is located at the shoe midsection which generates substantial heat. The gel bladder 32 is used to contain the water solution 34 that is expelled from the contracted gel and allows the water solution 34 to flow around and conform to the foot that is inserted into the shoe. Preferably, the bladder 32 extends from the quarter 35, around the collar 36 to the achilles tendon area 38 for providing support for the collar, which assists in maintaining the foot within the shoe, and for assisting in protecting the achilles tendon.

Referring to FIG. 3, an enlarged section of the gel bladder 32 is shown in a cavity 32c formed between the outer layer of shoe material 20 and the inner layer of shoe material 22. In the preferred embodiment, the gel bladder 32 is extended from the temperature-responsive gel portion 30 in the quarter 35, around the collar 36 to the achilles tendon section 38 such that water solution 34 can be distributed from the midsection of the foot towards the heel location and allows the shoe to better conform thereto as the shoe is heated.

In this embodiment, the temperature-responsive gel in the shoe is an environmentally-responsive gel. An environmentally-responsive gel is a microporous, fast responsive, crosslinked gel obtainable from a polymeric precursor, the gel being of sufficient flexibility to enable the gel to be reversibly responsive to a change in an environmental condition such as temperature. The gel can be made from any responsive polymer with side groups that can react with a di- or multi- functional crosslinking molecule. The polymers can have hydroxyl, acid or amine side groups and which have lower critical solution temperatures in aqueous solutions together with water-soluble crosslinkers. Even more particularly, the gel is preferably a temperature-responsive gel and is able to undergo a phase separation or phase transition which is temperature induced. Still further, the precursor is preferably a linear polymer or cellulose ether, and more particularly, hydroxypropyl acrylate/hydroxyethyl acrylate copolymer. Preferably the hydroxypropyl acrylate/hydroxyethyl acrylate copolymer gel is comprised of between 50 to 100 percent hydroxypropyl acrylate and between 50 to 0 percent hydroxyethyl acrylate. Also, the water-based fluid used to make the gel can include sucrose in the range of 30% to 60% to vary the reaction temperature. Further, to enable the temperature-responsive gel to operate at lower temperatures, glycerin or glycol can be added to reduce the freezing temperature of the solution.

The environmentally-responsive or temperature-responsive gel that can be used in shoe portions as described herein, such as the quarter and collar, the tongue and the foot bed, is also described as a gel that undergoes a phase change, i.e., from a liquid to a gel, at a particular temperature such that the gel is a liquid at room temperature and increases in viscosity to form a gel at a temperature between room temperature and body temperature or vice versa.

An alternative embodiment of the present invention provides a gel composition that can be tailored to either soften or become firm at a predetermined temperature. Typically, these gel compositions have first and second transition temperatures. Below the first, lower transition temperature, the composition is a liquid, which gels and becomes firm on heating. If the heating is continued, a second, higher transition temperature is reached, at which the gel liquifies. Both transition temperatures can be adjusted by the inclusion of additives. Therefore, it is possible to provide a gel composition that will either liquify or gel at a preselected temperature. In the preferred embodiment, the liquid to gel transition occurs at or near body temperature.

A preferred gel composition of this type is a polymer gel including a mixture of water and polyethyleneoxide/polypropylene oxide (PEO-PPO) block polymer, which can, but need not, contain additives, such as polyethyleneoxide (PEO) homopolymer and/or polypropyleneoxide (PPO) homopolymer, and hydrophilic compounds such as alcohols, acids, salts, and the like. By varying the concentration of a homopolymer or other additive in the base mixture/PEO-PPO block copolymer in water, the transition temperatures and the firmness of the gel can be adjusted as desired. By providing a gel composition that hardens on heating, a shoe insert can be obtained that flows to conform to the shape of the wearer's foot, and then gels to provide proper support.

A preferred PEO-PPO is Pluronic F127 polyol, manufactured by BASF. This polyol typically has a molecular weight of about 12,500, and consists of about 70% by weight EO and 30% by weight PO. The formula for the polyol is approximately $EO_{99}$-$PO_{65}$-$EO_{99}$.

Figure 12:
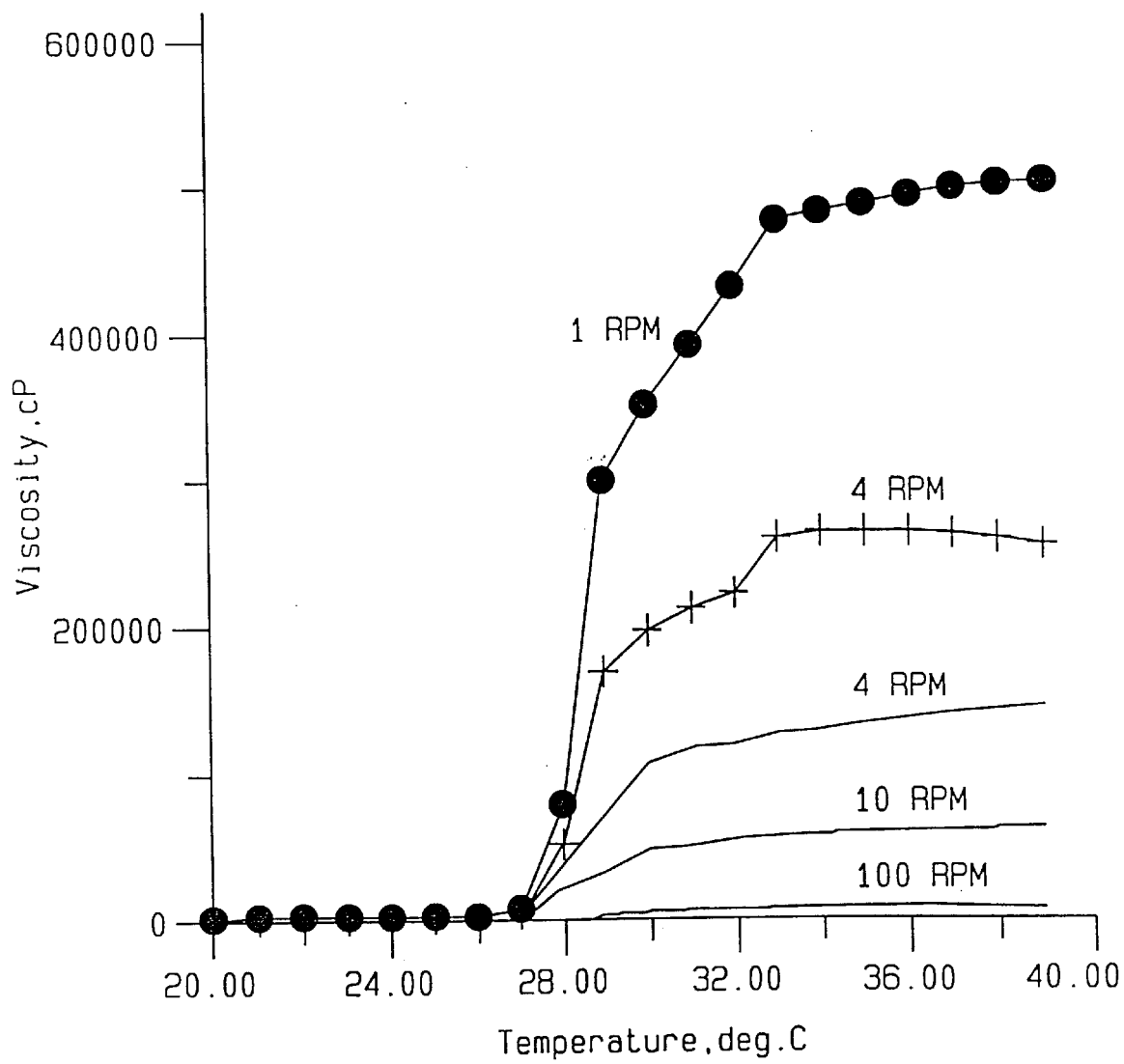
FIG. 12 is a graph of viscosity versus temperature for a temperature responsive gel according to the invention.
Figure 13:
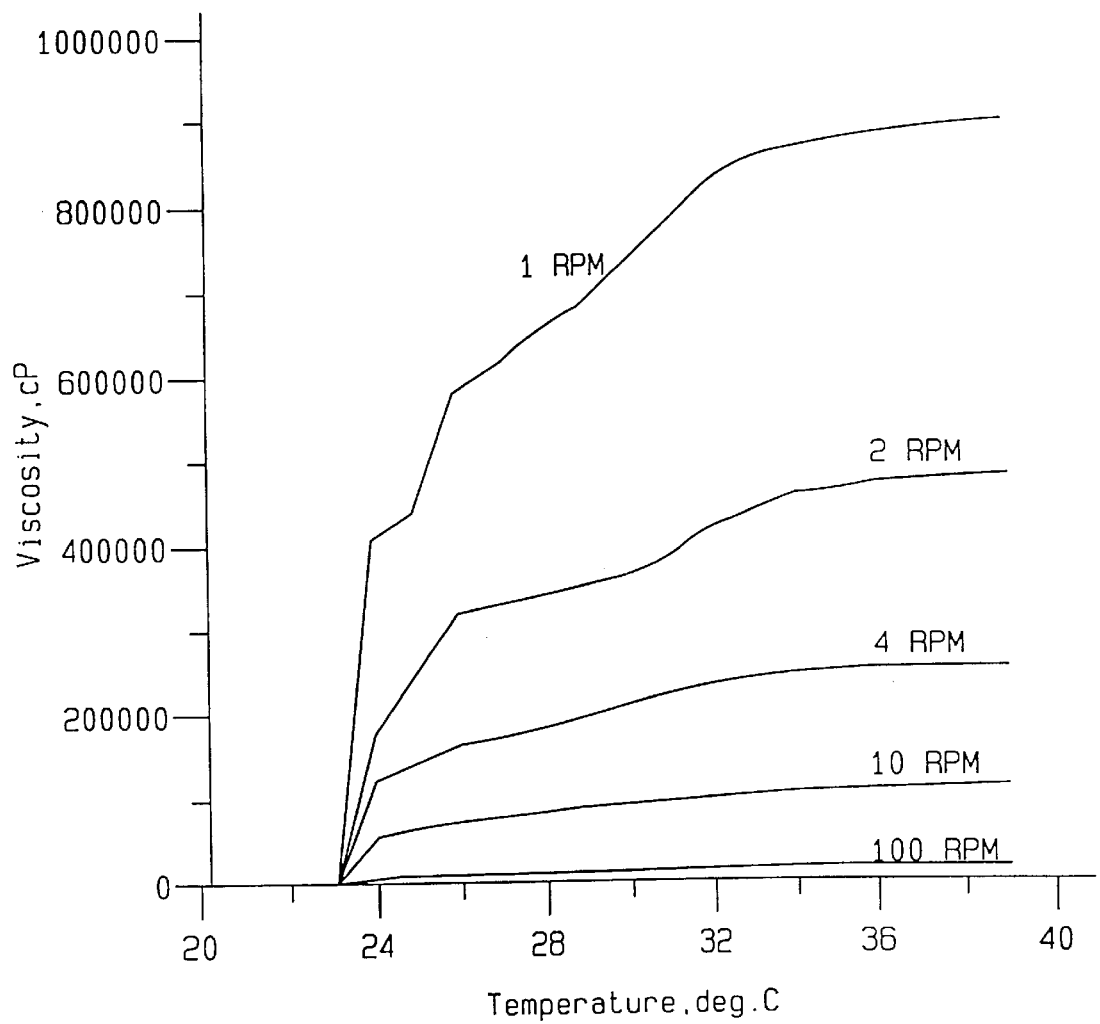
FIG. 13 is a graph of viscosity versus temperature for a temperature responsive gel according to the invention.

The gel compositions of the present invention are water based and comprise about 5% to 30% PEO-PPO by weight. Gel compositions consisting of only PEO-PPO and water typically have a transition temperature from a liquid to a gel of about 20° C. to 35° C. The transition temperature can be adjusted by adding varying amounts of other additives, including, but not limited to, homopolymers such as PEO and PPO, and hydrophilic compounds, such as alcohols, glycerin, sorbitol, saccharose, acids, and salts. These additional additives can be added, alone or in combination, in amounts of up to about 85% of the weight of the composition to extend the transition temperature range. The transition from a liquid to a gel can be seen in FIGS. 12 and 13. FIG. 12 is a mixture of 16.5% PEO-PPO in water, as measured on a Brookfield viscometer at rotational speeds of 1 rpm (the upper curve) to 100 rpm (the lower curve). The graph shows a clear liquid to gel transition at 27° C. FIG. 13 shows a lower transition of 23° C. to a firmer gel.

In a further embodiment of the present invention, the environmentally-responsive gel in the shoe portions described herein, such as the quarter and collar, the tongue and the foot bed, is comprised of a reversibly gelling, responsive polymer network of at least two polymers, in which the interaction of the polymers provides a synergistic effect that provides properties that are not possessed by the constituent polymers, whether the polymers are utilized individually or in a simple blend. A responsive polymer network is a special type of polymer composition in which two or more polymers interact without covalent bonding to provide a stable, miscible composition with unique properties that result from the interactions of the polymers. The miscible compositions are formed regardless of the miscibility of the components. The responsive polymer network comprises at least one responsive component capable of aggregating in response to environmental stimuli, at least one structural component that supports and interacts with the responsive component, and an aqueous solvent. The form of aggregation in the responsive component includes micelle formation, precipitation, and labile crosslinking. Covalent bonding between the components is not required.

The responsive component is an oligomer or polymer that will change its degree of association and/or agglomeration in response to changing stimuli, such as temperature, pH, ionic concentration, solvent concentration, light, magnetic or electrical field, pressure, or other environmental triggers that are known to trigger a response in a responsive gel material. Preferably, the responsive component is a temperature sensitive aggregating polymer, which undergoes changes in conformation and micelle concentration with a change in temperature, changing from an open, non-aggregated form to a micellular, aggregated form. The preferred transition temperature range is from about 0° to 100° C., and, most preferably, at or around body temperature, i.e., 30° to 40° C., but may occur at much higher or lower temperature, as long the temperature is above the freezing point and below the boiling point of the solution.

The structural component is an oligomer or polymer that is not required to be responsive, but which supports and interacts with the responsive component to form a responsive polymer network. The interaction of the structural component magnifies the effect of the responsive component in gelling the composition in response to a stimulus.

Preferably, the structural component is a polymer that is capable of ionization in response to a change in the ion strength of the solution, which typically results from a change in pH or salt concentration. A change in the ionic state of the structural component causes the polymer to react to attractive (collapsing) or repulsive (expanding) forces in the molecule. Therefore, the interaction between the responsive and structural components can be adjusted by selecting an appropriate pH or salt concentration for a given application.

The response of the responsive component to a stimulus, if any, in the absence of the structural component, is qualitatively or quantitatively different from that of the responsive polymer network. The presence of the structural component amplifies and/or alters the response of the responsive component.

In addition to the structural and responsive components and the aqueous solvent, the responsive polymer network may contain additives that are required for particular applications. Additives useful with the present invention include nonionic surfactants, acids, bases, salts, dyes, fillers, and the like.

Responsive polymer networks are formed by dissolving about 10 to 75% based on the total weight of solids of at least one responsive component and about 90 to 25% based on the total weight of solids of at least one structural component in an aqueous solvent. The interaction between the constituent polymers in the resulting responsive polymer network permits the formation of clear, colorless gels with a very low solids content, with gelling observed in aqueous solutions of about 0.01 to 20% based on the weight of solution of the responsive component and about 0.01 to 20% based on the weight of solution of the structural component.

The responsive polymer is typically a linear or branched polymer or oligomer of the general formula $(P_1)_a(P_2)_b(P_1)_a$, where $P_1$ is typically a polyol of general formula $(CH_2CH_2O)_a$, and $P_2$ is typically a polyol of general formula $(CHRCHRO)_b$, where R may be H or alkyl, and a is about 10 to 50 and b is about 50 to 70, but $P_1$ and $P_2$ may be any polyol combination that provides the desired responsive polymer network. Viscosity increases of about 5 to 100-fold, and, preferably, about 10 to 50-fold are observed in the responsive polymer networks of the present invention.

A typical responsive polymer network contains less than about 4% of total polymer solids, of which less than about 2% is responsive component, and less than about 2% is structural component, with the remainder comprising aqueous solvent. A preferred responsive component is a triblock polyol of the formula $(PEO)_a(PPO)_b(PEO)_a$, where a is about 10 to 50, and b is about 50 to 70. At the transition point, such a gel will typically provide ten-fold increase in viscosity over a temperature change of 5° C.

Typical structural components include ionizable polymers, which are responsive to changes in pH and/or ionic strength. Preferred ionizable polymers include carboxyvinyl polymers of monomers, such as acrylic acid, methacrylic acid, ethacrylic acid, phenyl acrylic acid, pentenoic acid, and the like, and one or more poly(carboxyvinyl) polymers may be used in the responsive polymer networks of the invention. Most preferred is polyacrylic acid. Copolymers, such as copolymers of acrylic and methacrylic acid are also useful as the structural component.

The most preferred reversibly gelling responsive polymer network comprises an aqueous solution of up to about 4% of the responsive and structural components in a 1:1 ratio, wherein the responsive component is Pluronic® F127, and the structural component is polyacrylic acid.

The foam portion 40, which makes up the remainder of the conforming layer 24, can be made of many standard foams that are available. The foam portion 40, however, is preferably made of a memory foam, i.e., a foam that deforms upon compression and, once the pressure is released, will slowly return to its original position. The foam portion 40 is preferably made with a Shore C hardness of approximately 25. The foam portion 40 is used to surround and secure the flowable, viscoelastic gel portion 50 and the temperature-responsive gel portion 30.

The foam portion 40 can be comprised of a polyol, antifoam agent, catalyst and Isocyanate. Still further, the memory foam can be formed from approximately 58% Arcol LG-168, approximately 1% water, approximately 0.5% Dabco 131, approximately 0.5% Dabco 33LV and approximately 40% Isocyanate 2143L.

Figure 4:
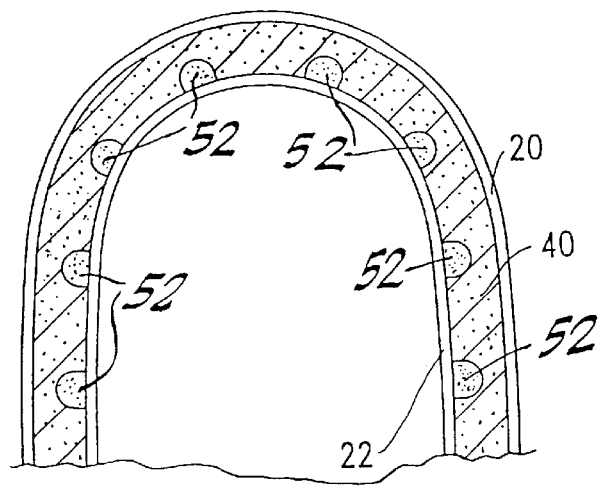
FIG. 4 is a cross-sectional view of the heel of a shoe according to the present invention incorporating viscoelastic gel and foam therein to conform to the foot.

FIG. 4 discloses a cross-section of the preferred embodiment of the shoe heel wherein the plurality of viscoelastic fingers 52 are disclosed extending in the vertical direction up the shoe heel so that the viscoelastic material can conform to the foot that is inserted therein. The viscoelastic fingers 52 are molded and then encapsulated by the foam material 40. The fingers extend into the concave contours of the foot heal to provide a more securing fit.

Figure 5:
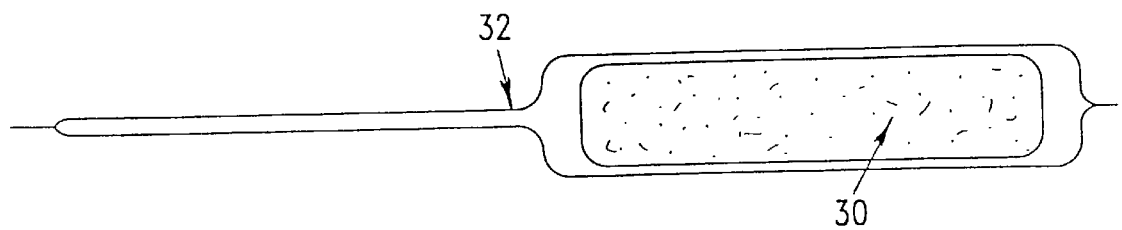
FIG. 5 is a cross-sectional view of the temperature-responsive gel and bladder in the expanded state.

One temperature-responsive gel 30 and gel bladder 32 are shown in the expanded or cool state in FIG. 5. As stated above, the temperature-responsive gel 30 is expanded at temperatures below the lower critical solution temperature, which should be between approximately 60 to 90 degrees Fahrenheit. In the expanded state the gel contains a water-based solution therein. Thus, the bladder 32 is relatively empty when the gel 30 is expanded.

Figure 6:
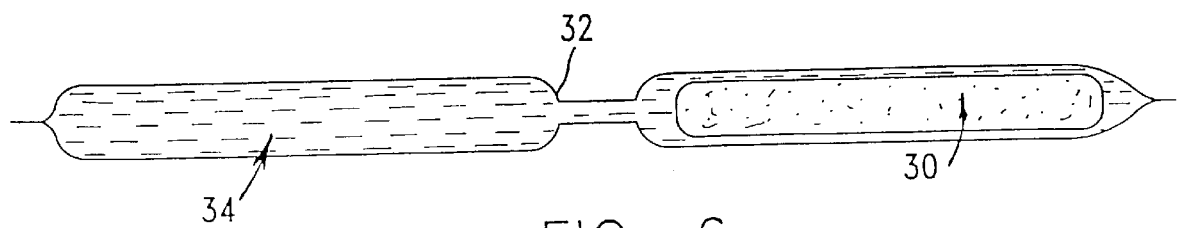
FIG. 6 is a cross-sectional view of the temperature-responsive gel and bladder in the contracted state.

The temperature-responsive gel 30 and gel bladder 32 are shown in the contracted or heated state in FIG. 6. The temperature-responsive gel 30 is heated due to the heat emitted from the foot inside the shoe. As the temperature-responsive gel 30 is heated above lower critical solution temperature the gel contracts and the water solution 34 therein is expressed from the gel and into the bladder 32. Thus, the water solution 34 dynamically flows to areas under less pressure as the shoe is heated. This enables the shoe to dynamically conform to the foot that is inserted therein.

As the temperature-responsive gel 30 cools when the foot is removed from the shoe the gel expands and retracts the water solution 34 from the bladder 32. In other words, the temperature-responsive gel 32 returns to its expanded state as shown in FIG. 5.

Figure 7:
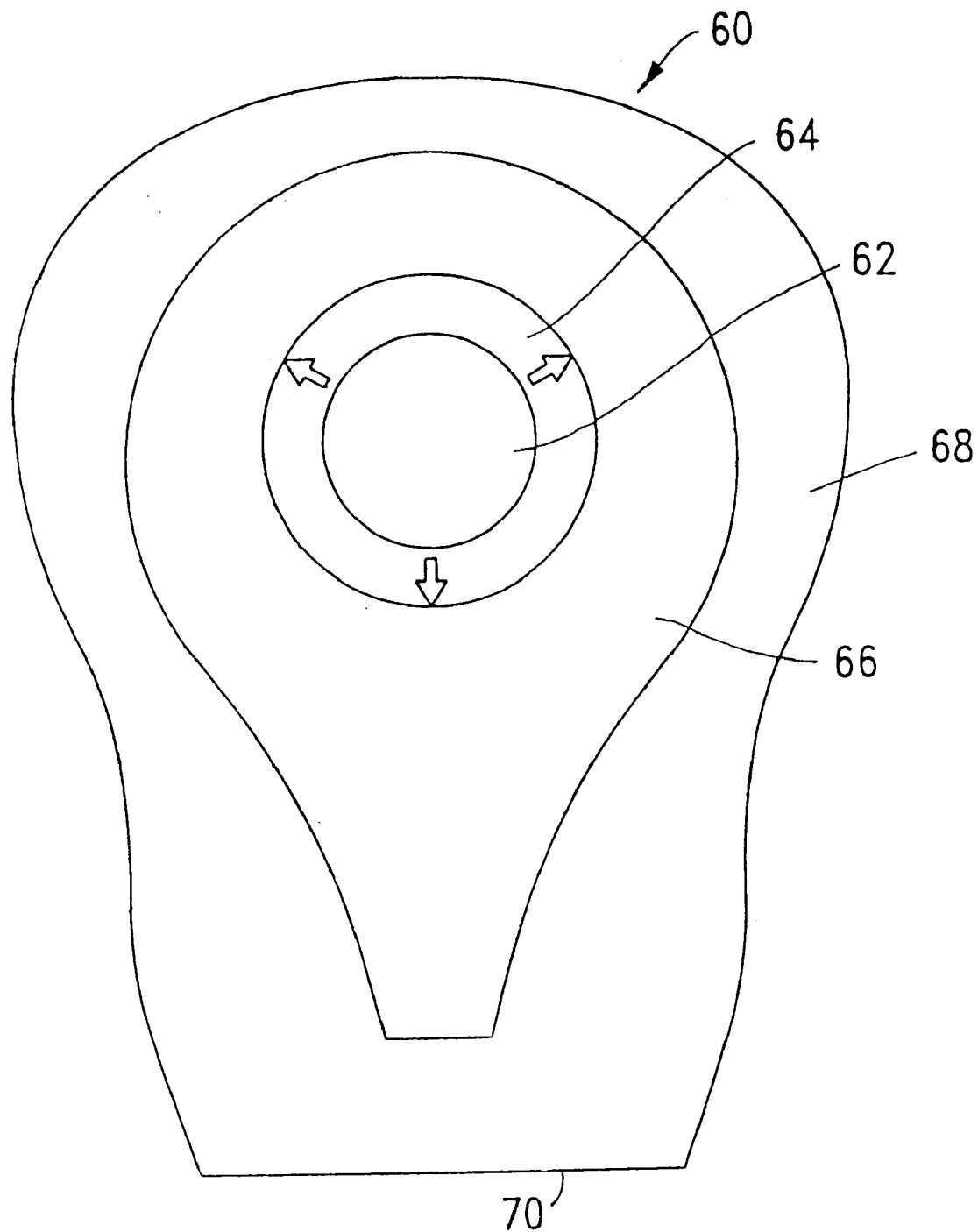
FIG. 7 is a top view of the conforming layer of a shoe tongue according to the present invention.
Figure 8A:
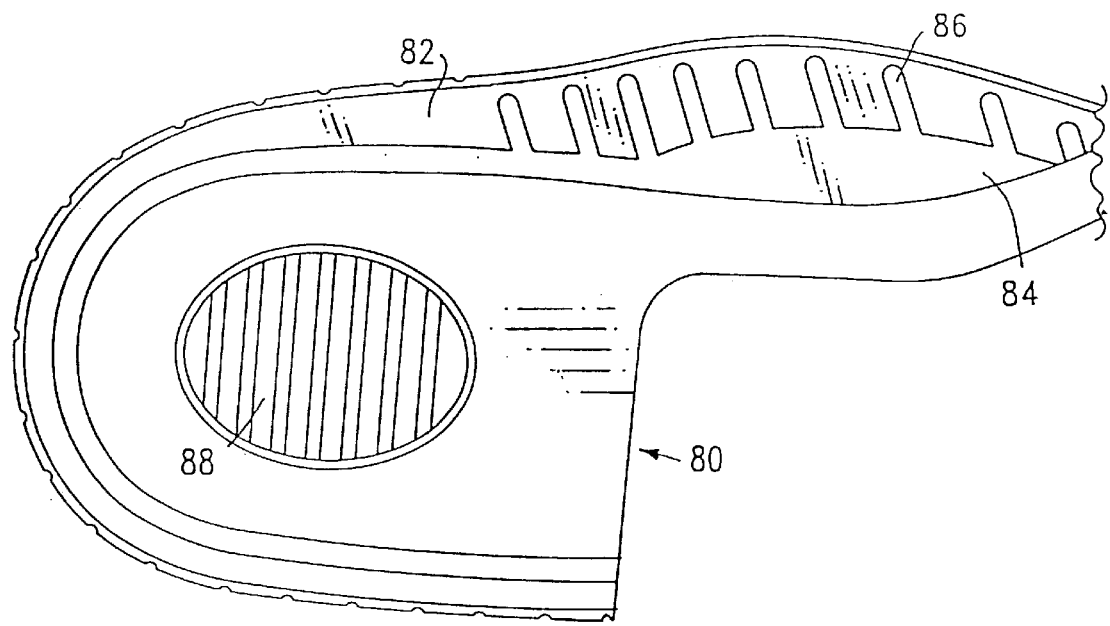
FIG. 8A is a top view of a foot bed according to the present invention.
Figure 8B:
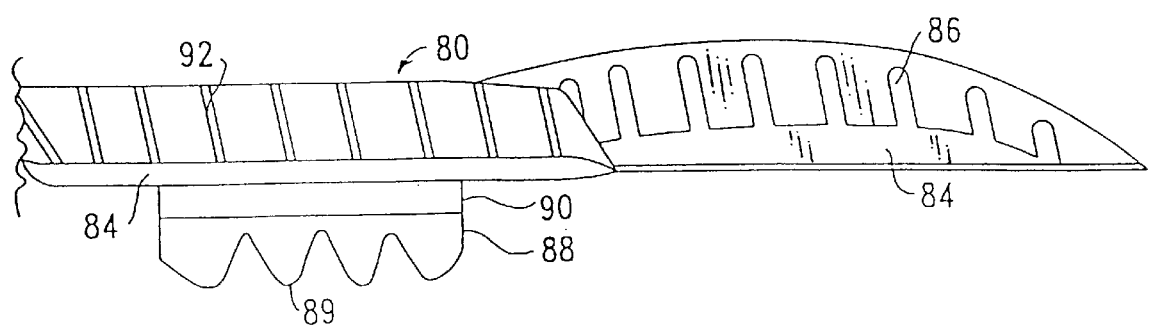
FIG. 8B is a side view of a foot bed according to the present invention.
Figure 8D:
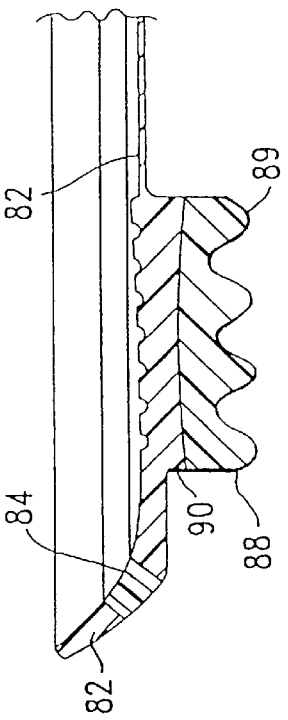
FIG. 8D is a sectional view taken along the line XX in FIG. 8A.
Figure 8C:
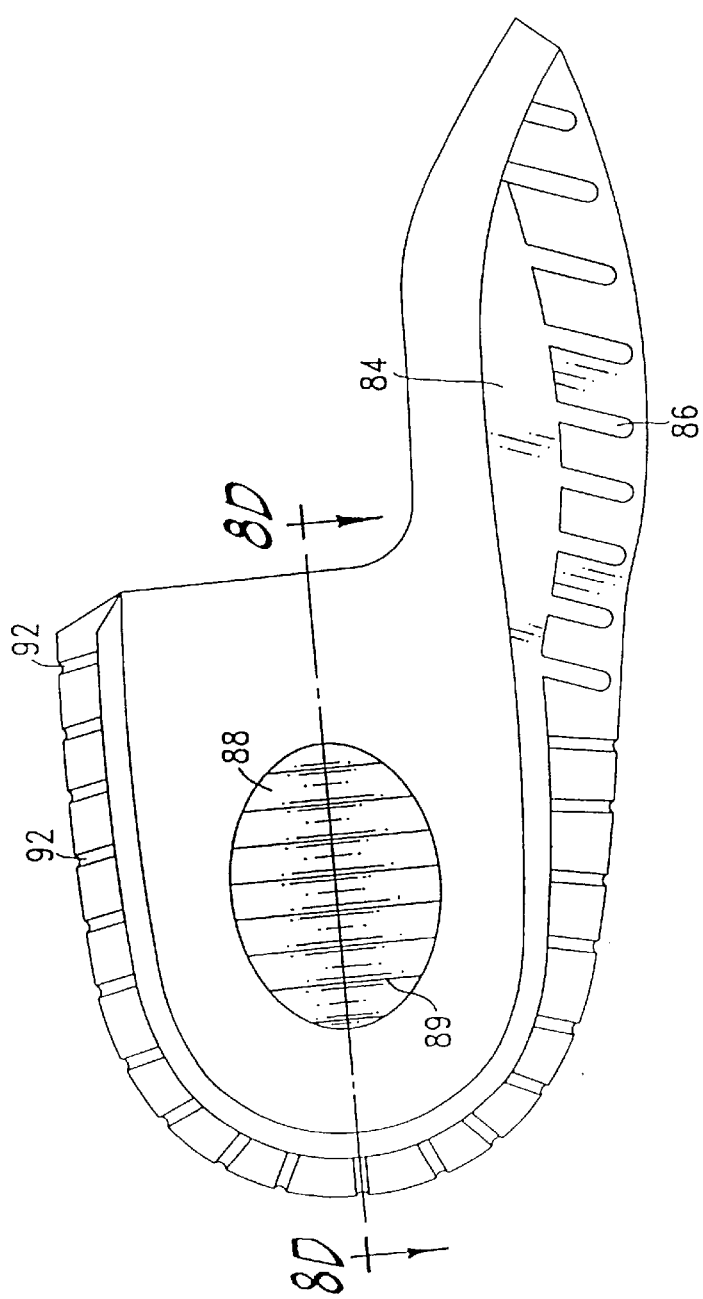
FIG. 8C is a bottom view of a foot bed according to the present invention.

FIG. 7 discloses the preferred embodiment of the shoe tongue conforming layer 60. The shoe tongue 16 is shown in FIG. 1 and is attached to the shoe 10 such that it covers a portion of the top of the forefoot that is inserted into the shoe 10. The conforming layer 60 is preferably comprised of a temperature-responsive gel portion 62 including gel bladder 64 extending thereabout, a viscoelastic gel portion 66 and a foam portion 68 enveloping both of the gel sections 62 and 66. The tongue conforming layer 60 is enveloped by an inner layer and an outer layer (not shown) substantially similar to the inner and outer layers of the shoe upper discussed above. The shoe tongue is then attached to the shoe upper along the bottom edge 70.

FIGS. 8A–8D discloses a foot bed 80 incorporating a foam main body section or foam pad 82, a plurality of relatively soft, flowable viscoelastic gel sections 84, relatively soft, flowable viscoelastic gel fingers 86 and a relatively hard, viscoelastic gel heel plug insert 88. Again, the viscoelastic gel sections could be located anywhere in the foot bed, but are preferably placed such that the relatively soft, flowable gel corresponds to those sections where the foot has the greatest contours and the relatively hard, higher viscosity gel corresponds to where the foot is subject to the greatest impact from walking, running or other activity. Thus, in the preferred embodiment, the viscoelastic gel section 84 and fingers 86 correspond to the foot arch area and extend around to the areas that correspond to the foot heel. The gels are again made to a –000 hardness between 10 and 100 and preferably in the range of 40 to 60.

The viscoelastic gel heel plug insert 88 is preferably located in the bottom of the foot bed to provided cushioning and shock absorption for the foot heel. This insert is preferably made of a gel having a –00 hardness between 20 and 60 and more preferably of approximately 40 to 50. The viscoelastic heel plug insert 88 preferable includes a plurality of ribs 89 to provide additional cushioning and absorption of shock for the foot heel.

The foot bed 80 also includes a foam heel plug 90 which is preferably formed of the same foot bed foam as the main body 82.

The preferred foot bed 80 also includes a plurality of grooves 92 that allow the flowable viscoelastic gel to extend up the back of the heel and that increase the flexibility of the foot bed 80. These grooves 92 are shown as extending around the outer edge of the foot bed and substantially in the vertical direction to provide proper flexibility of the foot bed.

FIGS. 9A–B disclose a second embodiment of a foot bed according to the present invention. The foot bed 81 includes the highly flowable viscoelastic section 84 and fingers 86 and the harder viscoelastic heel plug 88. The foot bed 81 further includes a metatarsal pad 94 with ribs 96 for providing cushioning to the foot. Still further, the foot bed includes wing members 98 with gel sections 100. These gel sections 100 can be made of the temperature-responsive gel and the water solution therein can flow in fingers 102 or the gel sections 100 and the fingers 102 can be made of the highly flowable viscoelastic gel. This provides a customized fit for the fore foot. Moreover, the wing members 98 can be provided with different thicknesses so that the customer can chose one that provides the most comfortable fit.

Figure 10:
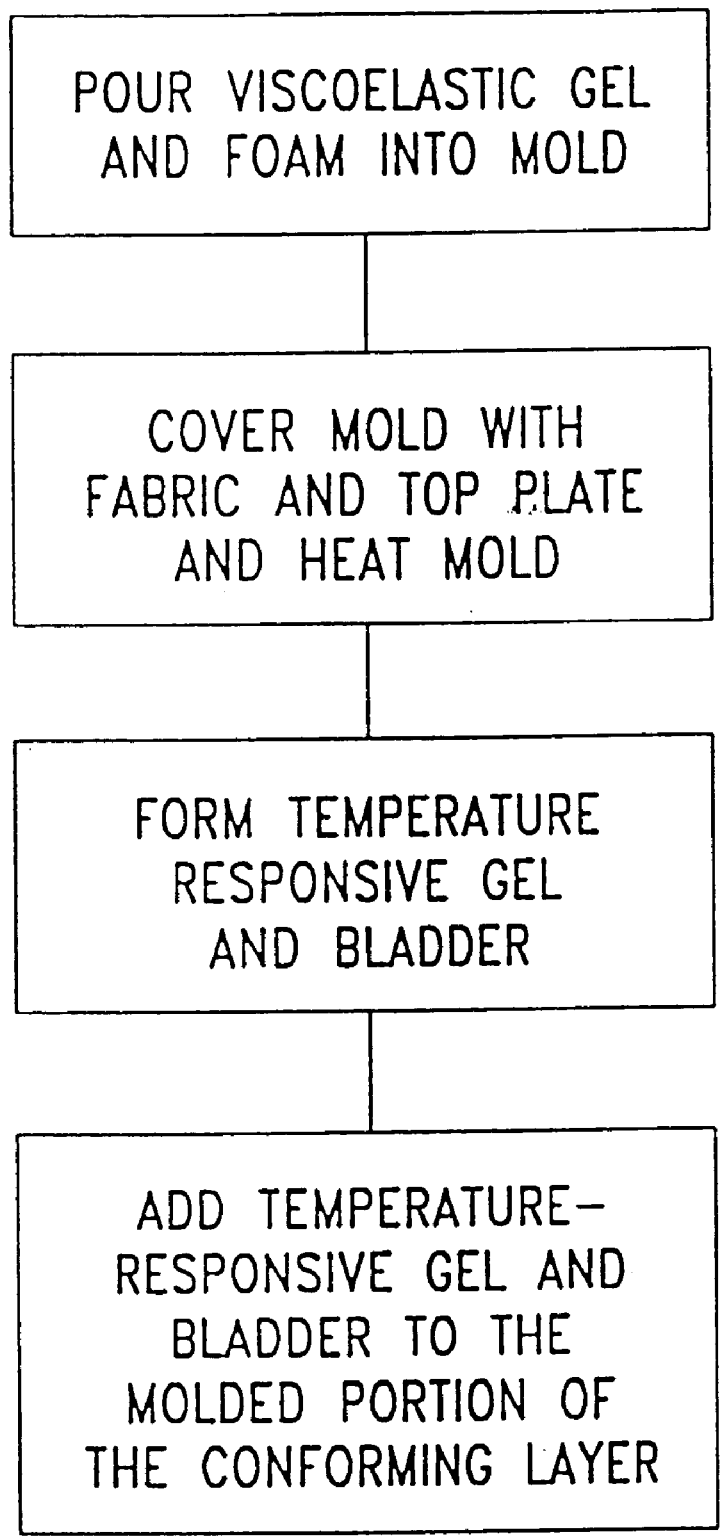
FIG. 10 is a flow chart of the method used to construct the shoe upper according the present invention.

FIG. 10 presents a flow chart of a method of forming a conforming shoe. The steps include forming a conforming shoe upper, as shown in FIG. 2, or tongue, as shown in FIG. 7, by pouring flowable, viscoelastic gel and foam ingredients into a mold to form a portion of the conforming layer of the shoe upper or tongue. Preferably, the viscoelastic gel is poured into the proper locations of a mold and then the memory foam ingredients are poured into the mold to fill the same. The inner layer of the shoe can be placed in the bottom of the mold before the gel and foam are poured therein such that the gel is formed on the inner layer. However, the preferred method is to attach the shoe inner layer to the top plate of the mold. The mold is closed with the top plate and the mold is heated. Heating can be accomplished by heating either the mold or the mold top or both to solidify the gel and foam. Thus, the flowable, viscoelastic gel and foam are molded onto the shoe inner layer.

The temperature-responsive gel is formed separately from the viscoelastic gel and foam. The temperature-responsive gel cassette and bladder are formed in a separate mold. A first layer of plastic film is placed into the mold. Preferably, the plastic film is about 10 mils thick and is a polyurethane film or a laminated film such as surlyn/polyethylene laminated film, to increase the water retention in the gel bladder.

A preferred plastic film is Exxon Exact film X-EMB-676. This film is vacuum formed over a cavity that is approximately 40 to 80 thousands of an inch thick. Then the responsive gel material is added at a relatively low temperature, preferably around 0 degrees celsius to keep the gel saturated with the water-based solution. Then a flat top layer of plastic film is laid over the mold. The top layer is preferably about 5 mils thick and formed of a polyurethane film or a laminated film such as surlyn/polyethylene laminate. The top and bottom layer films are then bonded by radio frequency bonding or other method.

The conforming layer of the shoe upper or tongue is completed by placing the temperature-responsive gel and bladder containing the same in the proper locations and attaching the shoe outer layer to the inner layer such that the conforming layer is between the outer layer and the inner layer.

After the shoe upper or tongue is formed, it is attached to the shoe in an ordinary manner.

The invention also includes another method that can be used to form adjacent regions of foam (polyurethane or other foam) and viscoelastic gel material. In this method, the foam and gel can be chemically bonded or unbonded and merely adjacent. More particularly, the method includes the steps of pouring foam material into a mold. Then viscoelastic gel with unexpanded microspheres can be injected into the mold cavity by a separate operation. The mold is then heated to a temperature above the expansion temperature of the microspheres. Depending on the temperature the mold is heated to, the expansion of the microspheres can be controlled to vary the pressure in the molded part.

Figure 11:
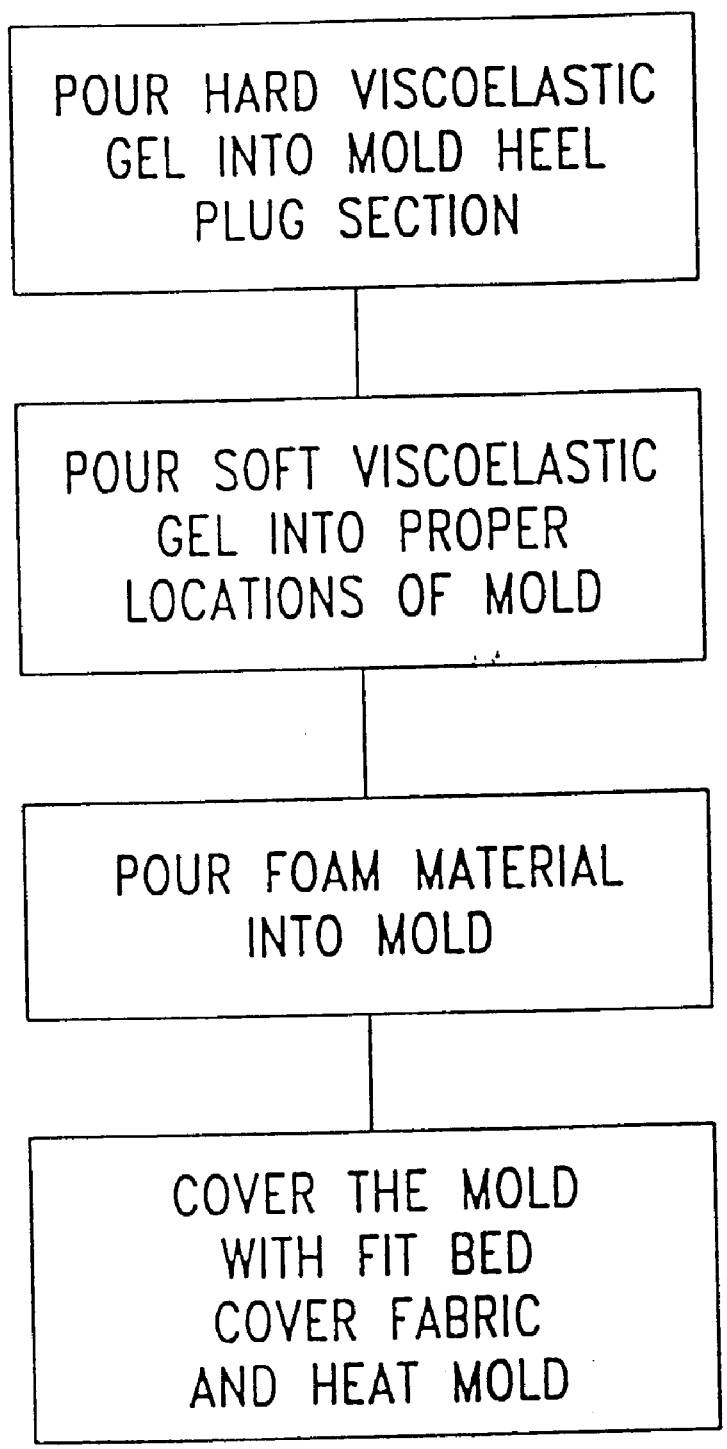
FIG. 11 is a flow chart of the method used to construct the foot bed according to the present invention.

Referring to FIG. 11, a shoe foot bed, as shown in FIGS. 8A–8D or 9A and 9B, is formed by pouring relatively hard, high viscosity, viscoelastic gel into the foot bed heel plug section of a mold, pouring a relatively soft, low viscosity, viscoelastic gel into desired locations that can include the arch area and sections around the foot heel and pouring the foam ingredients into the mold and covering the mold with the mold top with the foot bed cover fabric attached thereto and heating the mold.

Figure 14:
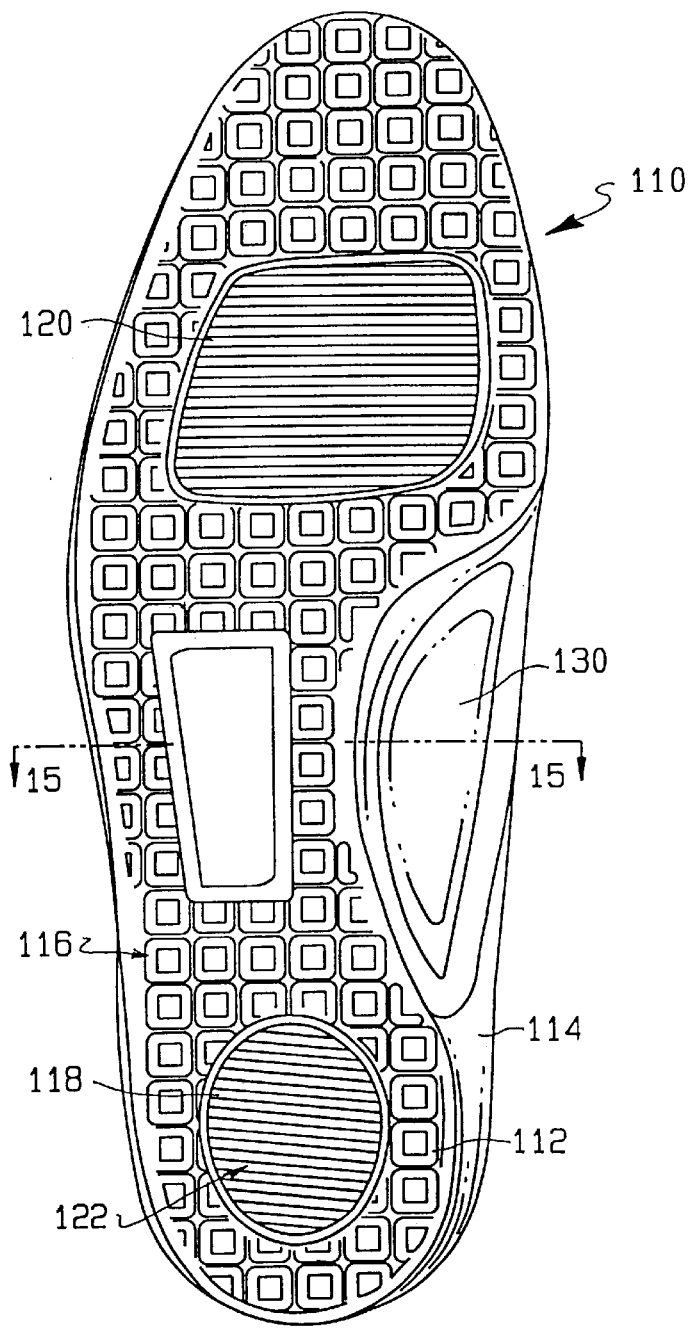
FIG. 14 is a bottom view of a foot bed according to the present invention.

Referring to FIG. 14, the bottom surface of another foot bed 110 is shown. The foot bed 110 is comprised of middle layer 114 and ribs 112 formed of a polyurethane foam. On the bottom surface 116 are two pads 118 and 120 formed of a polyurethane viscoelastic elastomer. Pad 118 is located in the heel section of the foot bed 110 to correspond to the heel of the user and provide cushioning therefor. The pad 120 is in the metatarsal section of the foot bed 110 to correspond to the metatarsal pad of the user's foot to provide cushioning therefor. Both pads 118 and 120 include a plurality of ribs 122.

Figure 15:
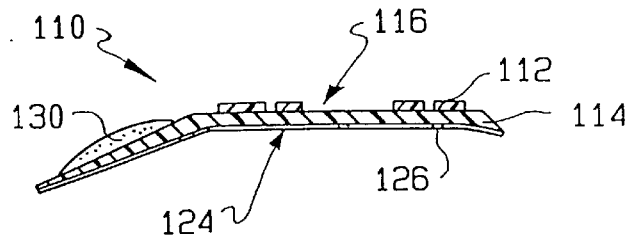
FIG. 15 is a sectional view taken along line 15—15 in FIG. 14.

The foot bed 110 also includes a top surface 124 as shown in FIG. 15. The top surface can be covered with a brush nylon, leather or textile layer 126.

The foot bed 110 also includes a bladder 130 which is filled with a temperature-responsive gel. The bladder is secured to the underside of the middle layer 114 in the arch area of the foot bed 110 to correspond to the arch of the user's foot and provide a snug fit and support therefor. Preferably, the temperature-responsive gel has a low viscosity, such as a liquid, at room temperature and becomes a gel with a much greater viscosity between room temperature and body temperature. More preferably, the temperature-responsive gel is a liquid or has viscosity less than 5000 cps at room temperature as shown in FIG. 15 and becomes a gel having a viscosity greater than 500,000 cps at a temperature approximately equal to body temperature.

In the preferred embodiment of foot bed 110, the temperature-responsive gel is in a liquid state and is highly flowable when the user first inserts her foot into a shoe incorporating the foot bed 110. In this manner, the temperature-responsive gel can flow to conform to the user's foot. As the user's foot heats the inside of the shoe having the foot bed 110 therein, the temperature-responsive gel increases in viscosity to provide fit and support for the foot. After the user's foot is removed, the temperature-responsive gel will cool to room temperature and return to the highly flowable or liquid state.

Referring to FIGS. 16–19, a tongue 132 for a shoe according to the present invention is shown. The tongue 132 is comprised of a bottom edge 134, which attaches to the shoe body (not shown). The tongue extends from the bottom edge and covers the upper surface of the user's foot. The tongue 132 often is interposed between the user's foot and shoe laces.

The tongue 132 is comprised of an inner layer 136 and an outer layer 138. The inner and outer layers are preferably comprised of leather. The outer layer 138 can further include a window 140 comprised of a transparent material such as polyvinylchloride (PVC).

Between the inner and outer layers 136 and 138 is a conforming layer 142 to provide fit, comfort and support for the upper surface of the user's foot. The conforming layer 142 is preferably comprised of a foam portion 144 and a gel portion 146. The foam portion 144 is preferably made from a memory foam such as those discussed above. The gel portion 146 is preferably made from an environmentally-responsive gel or a viscoelastic gel such as those discussed above. In the most preferred embodiment, the gel portion 146 is made from an environmentally-responsive gel that has a low viscosity (less than 5000 cps) at room temperature and a much greater viscosity (greater than 500,000 cps) at body temperature. Preferably, the gel is comprised of the PEO-PPO block polymer and water mixture as discussed herein.

FIGS. 18 and 19 disclose a second embodiment of the foam portion 148 of the tongue. The foam portion in this embodiment is formed with a plurality of apertures 150 therethrough. The apertures 150 are square in shape and reduce the weight of the tongue and allow air to more easily flow through the tongue. The tongue includes a cut out portion 152, in which the gel portion (not shown) can be inserted.

EXAMPLES

The following examples are provided only for the purpose of illustrating the invention and are not to be construed as limiting the invention in any manner.

EXAMPLES 1–12

Samples of a gel composition were prepared by mixing a suitable amount of PEO-PPO with water. The mixture was thoroughly stirred, and then cooled in an ice bath for about two hours. The resulting composition was an optically transparent solution that gelled between the lower and upper transition temperatures. The upper and lower transition temperatures were characterized by an abrupt change in viscosity. The transition temperatures for gel compositions of about 15–20% PEO-PPO in water are shown in Table 1.

TABLE 1

The effect of composition on lower and upper transition temperatures

| Example No. | PEO-PPO conc. (%) | Lower transition temperature, (° C.) | Upper transition temperature, (° C.) |
|---|---|---|---|
| 1 | 15 | 28–32 | 50–55 |
| 2 | 15.5 | 28–32 | 50–55 |
| 3 | 16.0 | 28–32 | 50–55 |
| 4 | 16.5 | 28–32 | 55–60 |
| 5 | 17.0 | 27–30 | 55–60 |
| 6 | 17.5 | 27–30 | 55–60 |
| 7 | 18.0 | 22–24 | 70–73 |
| 8 | 18.5 | 22–24 | 70–73 |
| 9 | 19.0 | 22–24 | 70–73 |
| 10 | 19.5 | 22–24 | 70–73 |
| 12 | 20.0 | 22–24 | 73–75 |

EXAMPLES 13–26

The transition temperatures of the gel composition were adjusted by the addition of an additive. The gel compositions were prepared by mixing PEO-PPO, water, and an additive in the manner of Examples 1–12.

Table 2 shows the influence of glycerin on the of the gels.

TABLE 2

The effect of glycerin on upper and lower transition temperature

| Example No. | PEO-PPO conc. (%) | Glycerin (%) | Lower transition temperature, (° C.) | Upper, transition temperature (° C.) |
|---|---|---|---|---|
| 13 | 15 | 0 | 28 | 50–55 |
| 14 | 15 | 1 | 27–28 | 55 |
| 15 | 15 | 2 | 27–28 | 55 |
| 16 | 15 | 3 | 26–28 | 56 |
| 17 | 15 | 4 | 26 | 58 |
| 18 | 15 | 5 | 25 | 70–75 |
| 19 | 15 | 10 | 23–25 | 75–80 |
| 20 | 15 | 15 | 23–25 | 78–82 |
| 21 | 18 | 0 | 22–24 | 70–73 |
| 22 | 18 | 5 | 20–22 | 75–80 |
| 23 | 20 | 0 | — | 73–75 |
| 24 | 20 | 5 | — | 80–85 |
| 25 | 20 | 10 | — | 80–85 |
| 26 | 20 | 15 | — | 85–90 |

EXAMPLES 27–33

The effect of PPO homopolymer in gels containing glycerin shown in Table 3. PPO is expected to interact with the PPO blocks in the PEO-PPO to make them larger and more stable. Increased stiffness occurred for PPO amounts of more than 40%, and increased the upper transition temperature.

TABLE 3

The influence of glycerin and polyol on properties of gels

| PEO-PPO | Glycerin | PPO homo-polymer | Upper transition (gel- |

| Example No. | conc. (%) | conc. (%) | conc. (%) | liquid) (° C.) | Remarks |
|---|---|---|---|---|---|
| 27 | 15 | 15 | 10 | 70–75 | |
| 28 | 15 | 15 | 18 | 70–75 | |
| 29 | 15 | 15 | 25 | 70–75 | |
| 30 | 15 | 15 | 30 | 70–75 | |
| 31 | 15 | 15 | 36 | 75–80 | |
| 32 | 15 | 15 | 40 | 75–80 | stiff |
| 33 | 15 | 15 | 44 | 80 | very stiff |

EXAMPLES 34–50

Salts increase the solubility of gels, and decrease the transition temperatures. The effect of NaCl on glycerin containing gel compositions is shown in Table 4.

TABLE 4

The influence of glycerin and NaCl on properties of gels

| Example No. | PEO-PPO conc. (%) | Glycerin (%) | NaCl (%) | Lower Transition temperature (° C.) | Remark |
|---|---|---|---|---|---|
| 34 | 15 | 5 | 0 | 70–75 | |
| 35 | 15 | 5 | 1 | 65 | |
| 36 | 15 | 5 | 2 | 60 | |
| 37 | 15 | 5 | 3 | | dissolves |
| 38 | 20 | 5 | 1 | 75–80 | |
| 39 | 20 | 5 | 2 | 75–80 | |
| 40 | 20 | 5 | 3 | 75 | |
| 41 | 20 | 5 | 4 | 70 | |
| 42 | 20 | 5 | 5 | 65 | |
| 43 | 20 | 5 | 6 | — | separates |

As can be seen in Table 4, small amounts of NaCl are able to lower the transition temperature. Therefore, NaCl is a convenient additive for adjusting the transition temperature.

The effect of NaCl is confirmed in compositions that lack glycerin, as can be seen in Table 5.

TABLE 5

The influence of NaCl on properties of gels

| Example No. | PEO-PPO conc. (%) | NaCL (%) | Lower transition temperature (° C.) | Upper transition temperature (liquid to gel), (° C.) |
|---|---|---|---|---|
| 44 | 20 | 0 | | 73–75 |
| 45 | 20 | 1 | 10–15 | 70 |
| 46 | 20 | 2 | | 65 |
| 47 | 20 | 4 | | 65 |
| 48 | 20 | 6 | | 55 |
| 49 | 20 | 9 | | 43 |
| 50 | 20 | 10 | −8 | 37–39 |

A gel containing about 20% PEO-PPO, 10% NaCl, and 70% water will have an upper transition temperature of about 37° C.–39° C.

The low transition temperature gels were prepared at temperatures of about 50°–55° C. by mixing the components in the manner of Examples 1–12, but with the mixing vessel placed in a hot water bath.

Other applications for the PEO-PPO gel include applications where conforming or phase change properties are desired, such as 1) Toys (seal tubes containing fluids), 2) Valves, 3) mattresses; 4) cushions; 5) therapeutic hand exercising grips 6) shock absorbers; 7) chair seats; 8) therapeutic support pads; 9) handle bar grips and saddles; 10) sock and sock liners; 11) protective sports clothing and equipment; 12) earplugs; and 13) wound dressings.

While it is apparent that the illustrative embodiment of the invention herein disclosed fulfills the objectives stated above, it will be appreciated that numerous modifications and other embodiments may be devised by those skilled in the art. Therefore, it will be understood that the appended claims are intended to cover all such modifications and embodiments which come within the spirit and scope of the present invention.

We claim:

1. A shoe component having a foot conforming portion for conforming to the contour of an individual's foot, wherein said conforming portion:
   a) is disposed in said shoe component in a location that contacts the individual's foot; and
      i) is a liquid at a first temperature when the shoe component is not adjacent the individual's foot so that when the shoe component initially contacts the foot, the liquid flows to conform to the contour of the foot, and
      ii) the liquid changes to a gel when heated to a second temperature above said first temperature by contact with the individual's foot and after conforming to the contour of the individual's foot;
   wherein the temperature-responsive composition comprises a mixture of a temperature-responsive component and a structural component in an aqueous solvent.

2. The shoe component of claim 1, wherein the responsive component is a first polymer or oligomer which is present in an amount of about 0.01% to 20% by weight of the mixture.

3. The shoe component of claim 2, wherein the structural component is a second polymer or oligomer which is different from the first polymer or oligomer and which is present in an amount of about 0.01% to 20% by weight of the mixture.

4. The shoe component of claim 2, wherein the first polymer or oligomer is a linear or branched polymer or oligomer having the formula $(P_1)_a(P_2)_b(P_1)_a$, where $P_1$ is a polyol having the formula $(CH_2CH_2O)_a$, and $P_2$ is a polyol having the formula $(CHRCHRO)_b$, where R is H or alkyl, and a is about 10 to 50 and b is about 50 to 70.

5. The shoe component of claim 3, wherein the structural polymer is a carboxyvinyl polymer of an acrylic acid, a poly(carboxyvinyl) polymer, a copolymer of acrylic and methacrylic acids, or a polyacrylic acid.

6. The shoe component of claim 4, wherein the responsive component is a polyethyleneoxide/polypropyleneoxide block copolymer.

7. The shoe component of claim 5, wherein the structural component is a polyacrylic acid.

8. The shoe of claim 5, wherein the total amount of the responsive component and structural component in the mixture is about 4% by weight or less.

9. The shoe component of claim 8, wherein the mixture includes about 2% polyethyleneoxide/polypropyleneoxide block copolymer and about 2% polyacrylic acid.

10. The shoe component of claim 1, wherein the solvent is water.

11. The shoe component of claim 1, wherein the shoe component further comprises a shoe upper and a shoe sole and the foot conforming portion is part of the shoe upper.

12. The shoe component of claim 11, wherein the shoe upper includes a shoe quarter for overlying a mid-section of the foot and the foot conforming portion is part of the shoe quarter.

13. The shoe component of claim 11, wherein this shoe upper includes a shoe tongue for overlying an upper surface of the foot and the foot conforming portion is part of the shoe tongue.

14. The shoe component of claim 14, wherein the foot conforming portion is positioned and located in a foot bed that is inserted into the shoe component.

15. The shoe component of claim 14, wherein the foot conforming portion is an arch section of the foot bed which is positioned and located to correspond to an arch of the foot.

16. A shoe component having a foot conforming portion for conforming to the contour of an individual's foot wherein said conforming portion:

a) is disposed in said shoe component in a location that contacts the individual's foot; and b) includes a bladder containing a temperature-responsive composition which;
  i) is a liquid at a first temperature when the shoe component is not adjacent the individual's foot so that, when the shoe component initially contacts the foot, the liquid flows to conform to the contour of the foot, and
  ii) the liquid changes to a gel when heated to a second temperature above said first temperature by contact with the individual's foot and after conforming to the contour of the individual's foot;

wherein the temperature-responsive composition consists essentially of a mixture of a responsive component and a structural component in an aqueous solvent.

* * * * *